April 2, 1957   L. F. THIRY   2,787,486
RUBBER BUSHING
Filed Aug. 7, 1953   2 Sheets-Sheet 1
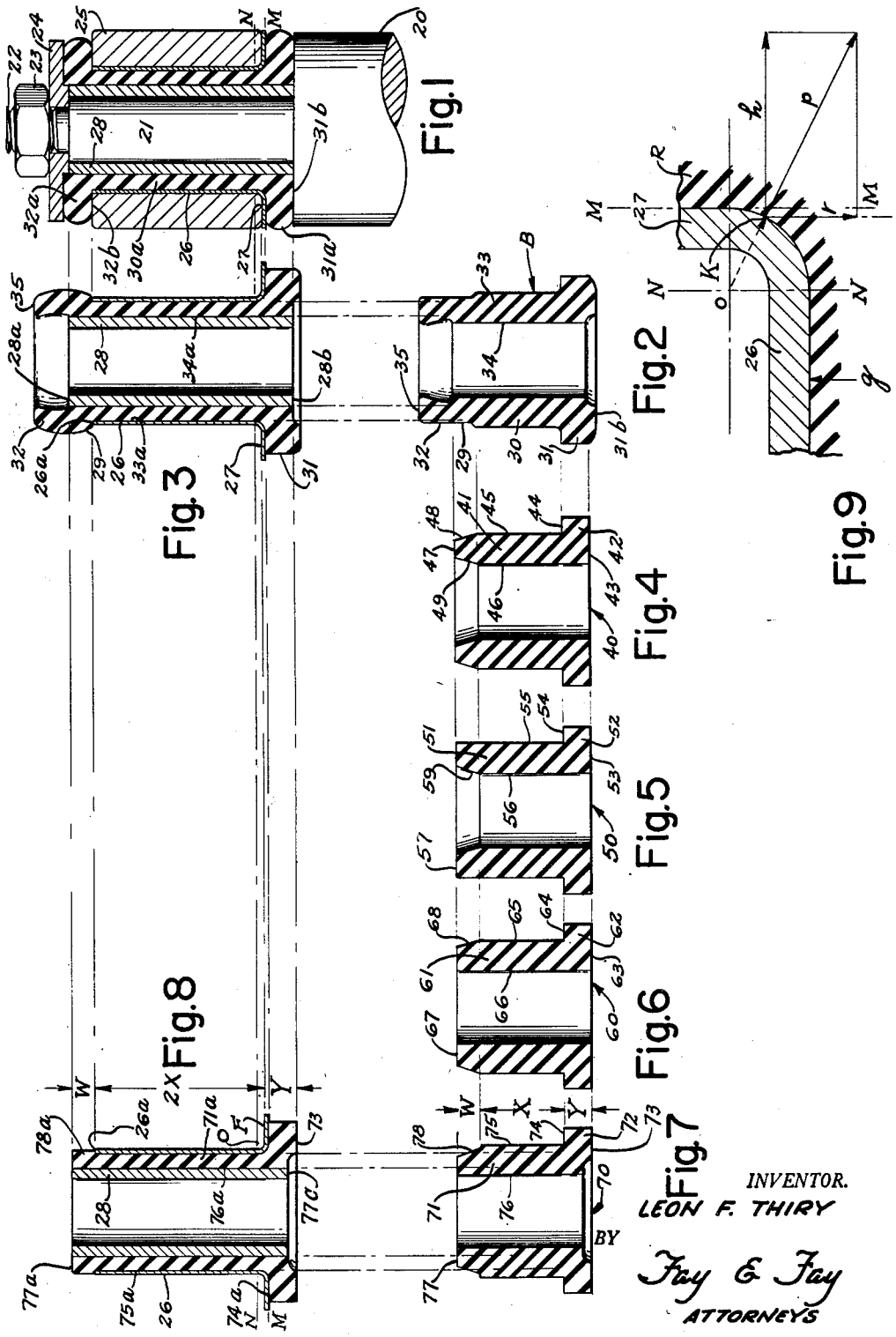
INVENTOR.
LEON F. THIRY
BY
Fay & Fay
ATTORNEYS April 2, 1957 L. F. THIRY 2,787,486
RUBBER BUSHING
Filed Aug. 7, 1953 2 Sheets-Sheet 2
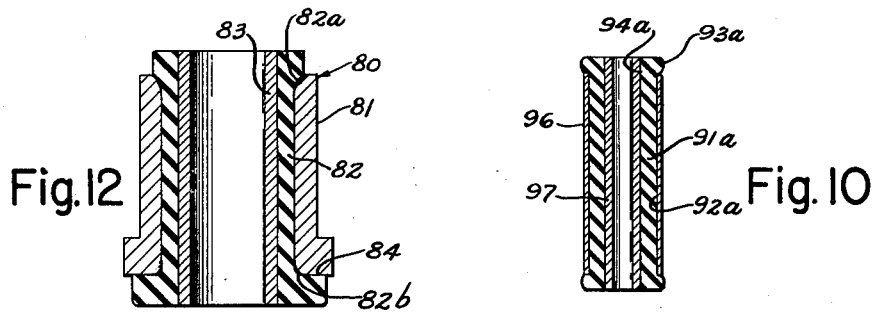
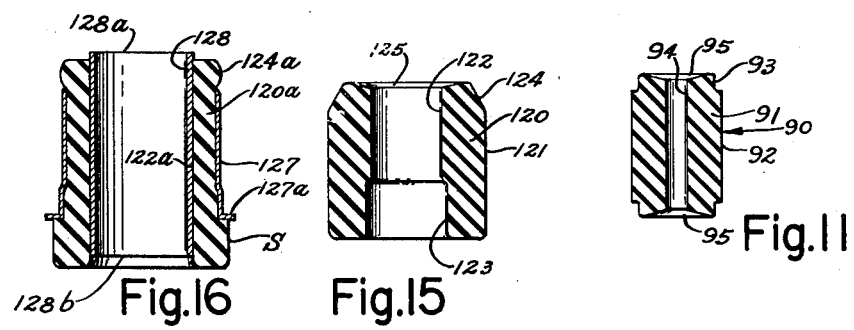
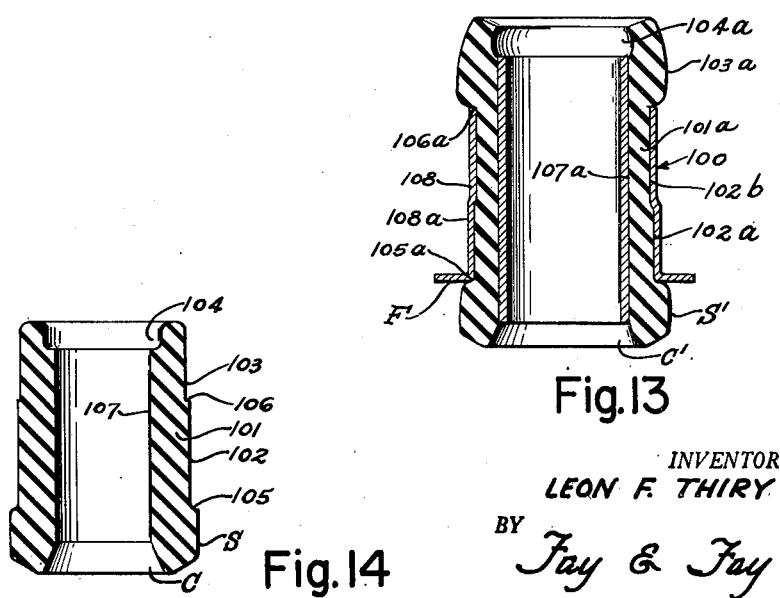
INVENTOR.
LEON F. THIRY
BY Fay & Fay
ATTORNEYS United States Patent Office 2,787,486
Patented Apr. 2, 1957

2,787,486

RUBBER BUSHING

Leon F. Thiry, Chagrin Falls, Ohio

Application August 7, 1953, Serial No. 372,836

3 Claims. (Cl. 287—85)

This invention is directed to improvements in pivotal joints of the type in which rubber is inserted between concentric inner and outer members, reduced in radial thickness and extended in axial length, and which has a rubber flange at at least one end of the bushing.

A primary object of this invention is to provide a flanged rubber bushing of the type described which will be cheaper to mold, easier to assemble, and to provide maximum flexibility of design in accordance with the necessities of particular applications.

Another object is to provide in a bushing of this kind means by which any initial momentary tendency of the deformed rubber insert to disengage itself from the adjacent metal members will be eliminated.

Still a further object is to provide in the structure of the rubber insert itself a balancing of disengaging forces at opposite ends of the bushing so that axial movement at the moment of assembly of the bushing in relation to the metal members is eliminated.

This invention is particularly related to the type of flanged bushings in which a rubber insert has its free state radial thickness substantially reduced and its original free state length substantially elongated in compensation for the radial reduction during the forcing of the rubber between two coaxial spaced rigid members. The invention is also intended to facilitate the manufacture of other similar types of bushings, including those of symmetrical end design. Bushings of this type are known by their excellent characteristics under radial loads and have great torsional mobility. Whereas conventional bushings used for similar purposes are normally either vulcanized to one or both adjacent metal surfaces or are expanded by axial forces into contact with the metal, deformed rubber bushings of the type referred to hereinabove are distinguished in their particularly rugged characteristics in that wear which might occur at any point in the rubber is immediately compensated by the action of both radial and axial tensions in the deformed rubber mass.

In the development of this type of bushing a limitation of a sort has, however, existed as a consequence of the tensions developed in the deformed rubber, and the difficulty may be explained in this way. In the assembly of a rubber insert between two spaced concentric metal or rigid members, the rubber element may be submitted to initial deformations in an amount that may be 40 to 60 percent reduction of the free state radial thickness and which may have a corresponding elongation axially of 100 or even 150 percent. Thus there is created in the assembled bushing a reaction pressure against the rigid walls of perhaps 200 to 300 pounds per square inch. It will be obvious that the assembly of the rubber with the metal in the presence of such pressures will present serious difficulties in the achievement of mass production. One way which these difficulties have been resolved is by the utilization of a special assembly technique which employs the presence of a peculiar phenomenon known in the Mitchell type of bearings. This method consists of providing the surface of the rubber with temporary films of slippery lubricant and then inserting the element at high speed within the metal parts so that no direct contact between the rubber and metal walls occurs during the insertion process.

Experience in the manufacture of bushings of this type has shown that the films of liquid used in the assembly process on the rubber element disappear within a relatively short time after the insertion is completed. Much of the film is, of course, scraped off as the rubber element is assembled into the metal parts and that which remains on the surface of the rubber is expelled axially or absorbed in the rubber itself. Upon the elimination of the film the initial temporary mobility of the rubber within the metal parts also disappears and a very considerable grip or type of pressure friction adherence develops between the contacting rubber and metal surfaces. This grip or type of bond is in some ways similar to the type of bond developed in vulcanization insofar as surface shearing is concerned. It should perhaps be pointed out that immediately (that is, within a relatively few seconds) after the insertion of the rubber between the spaced metal parts and during the period in which the lubricant film still remains between the rubber and the metal, it is sometimes possible to move the insert relative to one of the metal parts merely by finger pressure. However, after the film has been dissipated, the grip of the rubber relative to the metal parts is comparable to the shearing resistance accomplished through the best types of vulcanization and permits, for example, oscillation of nearly 100° in either direction without slipping in an automobile shackle size bushing.

Heretofore, the particular ruggedness and special advantages of the type of bushing described hereinabove have not been generally and practically available when a non-symmetrical flange type bushing is needed, since by reason of the particular type of assembly technique used, an initial unbalance of pressure forces occurs because of the presence of the flange. It will be obvious that a considerable degree of axial pressure will exist in a flanged bushing around the end of the flanged side and that this pressure will not be balanced by any corresponding pressure at this particular portion of the bushing. Therefore, during the limited period when the liquid film still persists between the rubber-metal surfaces after assembly, this pressure will tend to disengage or expel the insert from the adjacent metal pieces.

This invention is, therefore, directed to the providing of a solution which will allow the assembly of flanged bushings of the type described without the delaying interruption in automatic equipment production that might result if the elements of the assembled bushing had to be locked or held in place for even a few seconds during which the remaining portion of the film is eliminated.

Other objects and advantages will become apparent hereinafter when the following specification is read in conjunction with the accompanying drawings.

Fig. 1 shows in longitudinal cross-section mounted on a pin and under axial compression the bushing assembly illustrated in Fig. 3, with the free state form of the rubber insert element shown in Fig. 2;

Figs. 4, 5, 6 and 7 show in longitudinal cross-section variations in end design of the insert which may be employed to accomplish an assembly generally similar to that illustrated in Fig. 8;

Fig. 9 shows in enlarged scale how the internal pressure between the rubber and metal wall devolves itself into two components, one of which may encourage disassembly;

Figs. 10 and 11 show respectively assembled and free state forms of a modification of the invention in a symmetrical end design type;

Fig. 12 is a similar view of an assembled bushing showing undesirable features in the radial zone contour of the outer metal element;

Figs. 13 and 14 show views of another modification generally similar to Figs. 2 and 3, wherein a portion of an insert end protrudes beyond the end of the inner metal element;

Fig. 15 shows in longitudinal cross-section in the free state another variation of the bushing wherein both ends of the bushing are reduced in thickness on opposite sides; and Fig. 16 shows the insert of Fig. 15 in assembled form with the outer metal having a step inward of the flange area.

Referring now to the variety of figures shown in the drawings, it is believed that the types of bushing there shown can be divided into two general groupings. One form which the invention may take is that illustrated by the free state bushings shown in Figs. 4, 5, 6 and 7, wherein at the end of the bushing opposite the flange the cross-sectional area of the end portion is reduced either by tapering the outside surface of this end portion as in Fig. 6, the inside portion as in Fig. 5, or both the inside and outside portions as in Fig. 4. In Fig. 7 more abrupt shoulder reduction is made merging into an outside taper such as that shown in Fig. 6. The bushings shown in Figs. 11 and 15 are variations of the particular end treatment shown in the figures referred to immediately hereinabove in that an end or both end portions of the bushing are reduced in cross-sectional area.

The other principal group of bushings shown in the drawings is illustrated by the free state bushings shown in Figs. 2 and 14, wherein beyond the reduced end portion of the bushing discussed in the first group a further extension or prolongation of the rubber is provided beyond the end of the inner member as is shown in Figs. 3 and 13, which extension under axial compression may be formed into a flange similar to that on the preformed flange end. The same principles are involved in both forms of the invention.

Taking up first the type of bushing illustrated in Figs. 4, 5, 6 and 7, which are generally identified as bushings 40, 50, 60 and 70 with corresponding parts being similarly numbered in a higher series, it will be seen that the reduced end section identified throughout these figures as being in the W zone may be treated in several ways. In Fig. 4 the reference numeral 41 shows the body portion of the bushing which is that portion included within the X zone. 42 identifies the flange section or that part within the Y zone. The end face of the flange is identified at 43, and 44 represents the inward abutment surface of the flange, 45 is the outer surface of the bushing, and 46 is the inner surface of the body portion. 47 represents the end abutment surface of the reduced end portion, and 48 and 49 respectively the outer and inner surfaces of the reduced end portion, which in the case of Fig. 4 are each tapered to achieve a frusto-conical form. In bushing 50 the inner surface of the end portion of the bushing is tapered as at 59, and in bushing 60 the outer surface 68 is tapered. In bushing 70 a more abrupt shoulder is formed merging into a taper surface 78 on the outer part of the reduced end portion.

When these bushings are assembled into outer and inner members 26 and 28 with the rubber insert being axially elongated and radially reduced in thickness, the dilation of the insert upon the inner member and the contraction of the body portion of the bushing within the outer member transforms the reduced end portions into a positive hook as is shown at 78a in Fig. 8.

The change in form taken by the rubber sleeve in the process of its insertion between the inner and outer rigid members is made clear in Fig. 8, wherein the dotted lines indicate certain changes in dimensions that have occurred. For example, it will be seen that the body portion of the bushing identified in the X zone has now taken a length approximately twice the original length, whereas the length of the W and Y zones or the end portions of the insert remains substantially unchanged. The radial thickness of the body portion 71 is shown in the assembled form in Fig. 8 as 71a and it will be seen that the outer diameter of this body portion has been reduced to that shown by the number 75a and the inner diameter increased as at 76a. Since the entire inner diameter has been increased as the inner tube 28 is inserted during the assembly process, the reduced end portion in the W zone is forced outward as at 78a into contact with the abutment end 26a of the outer member.

The hooking relationship of the end 78a against the abutment surface 26a of the outer member thus provides a positive and definite stop restricting movement of the rubber relative to the rigid members during the brief period prior to the absorption or elimination of the liquid film used in assembly. The pressure which this hook must counterbalance or counteract is brought out by the force diagram shown in Fig. 9, wherein the pressure of the rubber R against the radius zone of the outer metal member 26 is illustrated. O represents the center of the arc interconnecting the horizontal and vertical surfaces of the outer rigid member at the flange portion, with the dotted line N—N representing a plane through O perpendicular to the horizontal axis of the bushing, and the dotted line M—M representing a vertical plane along the face of the metal flange 27. It should be borne in mind that at the moment of assembly, when a liquid film exists between the rubber and metal and when deformation of the rubber exerts a pressure of as much as 300 pounds per square inch against the metal walls, an unbalance of pressure can have serious consequences if not properly controlled. Under the laws of hydraulics applicable at such time the pressure on any point will be perpendicular to the wall at that point and there will be no friction to prevent slippage. The force vector P represents the perpendicular or resultant force of the rubber at the radius zone at a point K and the decomposition of this force may be illustrated in the familiar parallelogram of forces as a horizontal force $h$ and a radial or vertical force $r$. The radial or vertical forces, such as $r$ at this point, are not harmful since these are similar to the reactions of pressure in the cylindrical or body portion such as that identified as $g$ in this diagram, but the horizontal axial forces such as $h$ have no counterpart. It is these forces which stimulate disengagement of the rubber from the metal parts during the film period upon assembly.

I have found that the disengaging horizontal or axial forces $h$ at the flange end of the bushing can be counterbalanced by the provision of a rubber abutment surface at the opposite end of the bushing and that the pressure or grip or contact surface at the hook end of the bushing need not exert a reaction pressure of anywhere near the same order of magnitude as exists in the flange end.

In Figs. 10 and 11 are shown respectively an assembled and free state form of bushing generally similar to the type referred to in Figs. 4–7 except that in the free state form 90 both ends of the bushing are reduced in cross-sectional area. Here the body portion 91 terminates in symmetrical end portions 93 of reduced outer diameter. As the inner and outer surfaces 92 and 94 of the free state bushing are assembled within outer and inner rigid members 96 and 97, the body portion 91 takes the form shown in Fig. 10 as the rubber is axially elongated and radially compressed as at 91a. The reduction of the outer diameter of the body portion of the bushing transforms the end portions 93, which in the free state were of lesser diameter than the body portion, into hook portions 93a which bear against the end abutment surfaces of the outer member and which are also in a state of circumferential tension upon the end of the inner member.

Another variation of the type of the form of bushing referred to hereinabove is shown in Figs. 15 and 16. The free state form of this bushing shown in Fig. 15 has a body portion 120, outer and inner body surfaces 121 and 122, a reduced end portion surface 124 terminating in an end face 125. At the end of the bushing opposite the reduced end portion, the annular cross-sectional area of what will become the flanged portion of the bushing in assembly has been reduced and a counterbore 123 is provided. In this form the counterbore has its bottom at what will become the inward portion of the flange upon assembly. The assembled bushing shown in Fig. 16 has a body portion 120a disposed between outer and inner rigid members 127 and 128. The reduced end portion 124 becomes a hook portion 124a in contact with the end abutment surface of the outer member 127. The opposite end of the bushing is transformed into a flange or shoulder S which contacts flange 127a of the outer metal. In the particular assembly here shown, one end of the inner member 127a projects slightly beyond the hook portion 124a and the opposite end of the inner member 128b is positioned slightly inside of the outer face of the flange S. In this version the hook 124a restricts and counterbalances the disengaging force present immediately after assembly at the flange end of the bushing and, in an effort to reduce somewhat the amount of the disengaging horizontal forces that would exist because of the pressure at 127a in the radius zone of the flange, the annular cross-sectional area of the potential flange was reduced in the free state bushing.

In Fig. 12 there is shown for purposes of illustration, in a bushing assembly 80, an end contour form that may not lead to satisfactory results. Here a rubber insert element 82 is positioned between outer and inner elements 81 and 83. Instead of a generally abrupt end contour as was shown previously at 26a in Fig. 8, here the contour has been rounded as at 82a and with a formation such as this there may not be sufficient hooking contact between the rubber and the outer element to prevent axial movement because of the unbalance of forces created by the pressure at 82b against the flange portion of the outer element 84. It is believed that the end formation of the outer member should not be too rounded, and while the abutment surface need not be exactly at right angles, a somewhat abrupt abutment is believed desirable.

In Figs. 2 and 14 an additional feature is shown wherein an extension end is provided beyond the reduced end portion of the bushing heretofore discussed so that upon the application of axial compression generally similar flanges may be formed at opposite ends of the bushing. The bushing B in Fig. 2 has a body portion 30, inner and outer body portion surfaces 34 and 33, and a radial flange 31 having an end face 31b. The end portion 29 is reduced in annular cross-sectional area in a manner similar to that discussed hereinabove with respect to the W zone of the other bushings and beyond this reduced end portion an extension or projecting end 32 is provided terminating in an end face 35. Upon insertion of this free state bushing between outer and inner rigid members 26 and 28 as in Fig. 3 the body portion of the bushing takes the form shown at 30a, the reduced end portion forms a hook as at 29 in contact with the abutment surface 26a of the outer member. Extending beyond the end 28a of the inner member is the extension end portion 32, and the flange 31 is brought into abutting contact with the flange 27 of the outer member.

In Fig. 1 the shackle arm 20 has a bolt, pin or stud portion 21 having a threaded free end 22 mounted upon the nut 23 in contact with a side plate or link 24. As the nut is turned upon the pin the application of axial pressure forms the extension end portion 32 into a flange 32a similar to the formed flange 31a at the opposite end of the bushing. As the assembly is drawn up the inward edge of the flange 32b is brought into contact with a spring eye or casing member 25 so that flanges of substantially equivalent size are provided at each end of the bushing to resist axial forces.

In Fig. 14 a variation of the free state form of the bushing illustrated in Fig. 2 is shown wherein the body portion of the bushing 101 has an outer surface 102 and an inner surface 107. The reduced end portion has an outer surface 103 which is connected to a body portion surface 102 with a shoulder 106. Upon the reduced end portion is provided an extension and in this extension a further reduction in annular cross-sectional area is provided by a counterbore 104. The preformed flange S at the opposite end of the bushing is connected with the body portion by a shoulder 105 and within the bore of the flange portion a tapered counterbore is provided that extends approximately half of the axial length of the flange portion. In the assembled bushing 100 shown in Fig. 13 the hook portion 103a is brought into abutment contact with the end of the outer member 103 at 106. The extension end portion projects beyond the end of the inner member and its counterbore is indicated at 104a. In this variation the outer member has a step intermediate the flange F and the opposite abutment end with the surface 100a representing the enlarged portion of the outer member. The bushing assembly shown in Fig. 13 is then adapted to be brought under axial compression in a manner similar to that illustrated in Fig. 1 wherein flanges will be formed at opposite ends of the bushing.

In the drawings I have shown a variety of forms which the rubber element in its free state may have in order to provide upon assembly a proper hook portion in abutment contact with the end of the outer member. In Fig. 8 at 78a the amount of rubber made available in the hook portion is such that the hook does not protrude beyond the outer surface of the outer member. In Figs. 3 and 13 the hook does protrude radially beyond the outer diameter of the outer member but only to a limited extent since in this type of bushing during many applications it is necessary to insert the assembled bushing as in Figs. 3 or 13 within an outer casing and if the hook portion had too great a diameter it would be difficult to achieve the insertion.

The invention may be embodied in other specific forms by using or modifying the methods employed without departing from the spirit and essential characteristics of the invention. The present embodiments are, therefore, to be considered in all respects as illustrative and not restrictive, the scope of the present invention being indicated by the appended claims rather than by the foregoing description, and all changes which come within the meaning and range of equivalency of the claims are, therefore, intended to be embraced therein.

I claim:

1. A yielding mounting comprising an outer member providing an outer surface of revolution, an inner member within the outer member providing an inner surface of revolution coaxial with but spaced radially inward from the outer surface, said outer member being formed at each end with an annular abutment surface transverse to the axis of the said member's surface of revolution, and the inner member projecting axially beyond said abutment surfaces, and an annular rubberlike bushing element having a body portion between the said inner and outer surfaces and in a state of appreciable radial compression and axial elongation, said body portion of the bushing element having in its free state an internal diameter less than the outer diameter of the inner member and an outer diameter greater than the inner diameter of the outer member, said bushing element also having end portions having a free state internal diameter less than the outer diameter of the inner member and being in a state of circumferential tension when assembled upon the inner member and in pressure engagement with said abutment surfaces of the outer member, said bushing element in its free state being characterized by having in at least one end portion a lesser annular cross-sectional area than in the body portion but having in said end portion greater cross-sectional area than the annular cross-sectional area between said inner and outer surfaces of revolution and said end portion in its free state having no cross-sectional area intersected by a plane perpendicular to the axis of the bushing which is greater than the one defined by the next preceding plane toward the body portion.

2. The mounting defined in claim 1 in which the outer diameter of at least one end portion of the bushing element in the assembled mounting is not substantially greater than the outer diameter of the adjacent annular abutment surface and said one end portion in its free state having in the part thereof, which is substantially adjacent the abutment surface of the outer member when the bushing is assembled in the inner and outer members, no cross-sectional area defined by a plane perpendicular to the axis of the bushing which is greater than the cross-sectional area defined by the next preceding plane toward the body portion.

3. The mounting defined in claim 1 in combination with compression members cooperating with said inner member and spaced axially from the abutment surfaces of said outer member and in which at least one of said end portions of the bushing has integrally contiguous therewith an extension portion disposed axially beyond the end of said inner member, and said extension portion being of such volume and configuration as to provide a radial flange of substantially greater diameter than the outer diameter of the said end portion of the bushing between one of said compression members and an abutment surface of the outer member upon the application of axial pressure to resist displacement.

References Cited in the file of this patent
UNITED STATES PATENTS

| | | |
|---|---|---|
| 2,116,254 | Welker | May 3, 1938 |
| 2,209,403 | Kittner et al. | July 30, 1940 |
| 2,598,115 | Dodge | May 27, 1952 |
| 2,608,751 | Hutton | Sept. 2, 1952 |